United States Patent
Högler et al.

(10) Patent No.: US 9,242,620 B2
(45) Date of Patent: Jan. 26, 2016

(54) METHOD FOR PROGRAMMING A WIPER SYSTEM FOR VEHICLE WINDSCREENS AND WIPER SYSTEM

(75) Inventors: Eberhard Högler, Erligheim (DE); Sebastian Wagner, Renningen (DE)

(73) Assignee: Valeo Systémes d'Essuyage, La Verriére (FR)

( * ) Notice: Subject to any disclaimer, the term of this patent is extended or adjusted under 35 U.S.C. 154(b) by 0 days.

(21) Appl. No.: 13/989,067

(22) PCT Filed: Nov. 22, 2011

(86) PCT No.: PCT/EP2011/070633
§ 371 (c)(1),
(2), (4) Date: May 23, 2013

(87) PCT Pub. No.: WO2012/072447
PCT Pub. Date: Jun. 7, 2012

(65) Prior Publication Data
US 2013/0245895 A1    Sep. 19, 2013

(30) Foreign Application Priority Data
Nov. 30, 2010    (DE) .......................... 10 2010 052 775

(51) Int. Cl.
*B60S 1/08*    (2006.01)
(52) U.S. Cl.
CPC . *B60S 1/08* (2013.01); *B60S 1/0814* (2013.01)
(58) Field of Classification Search
CPC ....................................................... B60S 1/08
USPC .............................................................. 701/36
See application file for complete search history.

(56) References Cited

U.S. PATENT DOCUMENTS 5,920,709 A * 7/1999 Hartung ................ G06F 13/385
710/100
6,406,089 B1 * 6/2002 Zimmer .................... B60S 1/04
15/250.3

(Continued)

FOREIGN PATENT DOCUMENTS

DE       103 06 495 A1    8/2004
DE   10 20005 008 636 A1 *   8/2006 ................ B60S 1/08

(Continued)

OTHER PUBLICATIONS

NPL—Western Digital—Jumper Settings WD SATA and EIDE Hard Drives, Published in 2005. Accessed off the internet from: http://www.wdc.com/wdproducts/library/other/2579-001037.pdf on Oct. 10, 2014. Waybackmachine.org date is Dec. 3, 2010.*

(Continued)

*Primary Examiner* — John R Olszewski
*Assistant Examiner* — Jess Whittington
(74) *Attorney, Agent, or Firm* — Osha Liang LLP

(57) ABSTRACT

The invention relates to a method for programming a wiper system (10; 10*a*) for vehicle windscreens, in which for operating respectively a windscreen wiper (14, 15) a wiper module (12, 13) on the driver's side is programmed as master module (36) and a wiper module (12, 13) on the passenger's side is programmed as slave module (37), wherein the wiper modules (12, 13) consist of a reversing motor (18), if applicable a gear (19), a holder (22, 23) for fastening to the body of a vehicle, and a control (20), wherein in the control (20) at least data for a program sequence (38), vehicle-specific characteristic data (39) and data for the operation of the wiper module (12, 13) as master module (36) or respectively as slave module (37) are stored, wherein at least the wiper module (12, 13) on the driver's side is connected via an on-board wiring system interface (30) and a first data communication line (32) with a vehicle control unit (28). According to the invention, provision is made that before the activation of the wiper module (12, 13) on the driver's side via the first data communication line (32) in its control (20) the wiper module (12, 13) is defined or respectively pre-programmed neither as master module (36) nor as slave module (37).

7 Claims, 3 Drawing Sheets

(56) References Cited

U.S. PATENT DOCUMENTS

Figure 5:
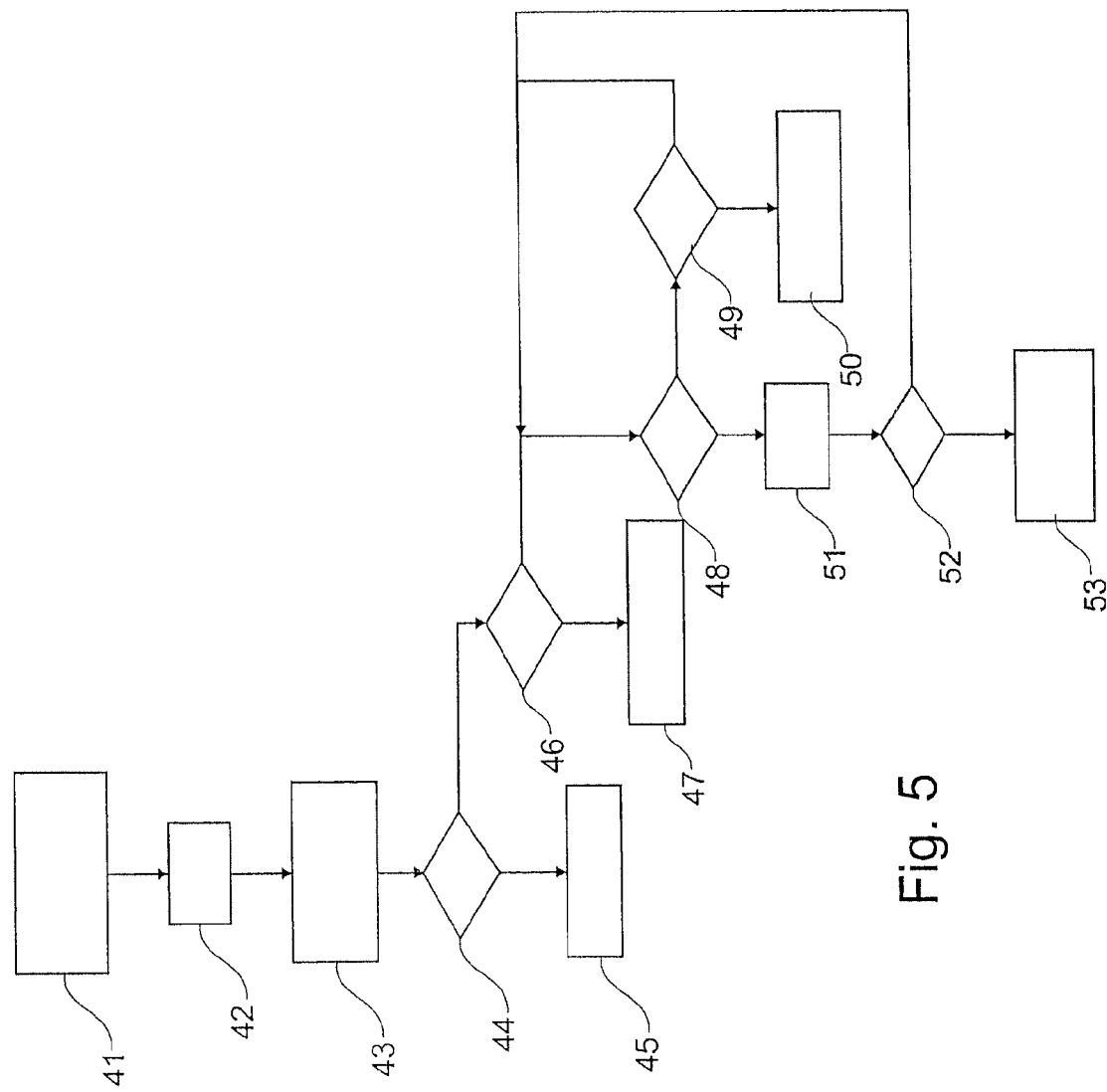

| | | | | |
|---|---|---|---|---|
| 8,112,197 B2* | 2/2012 | Amagasa | ............... | B60S 1/0814 15/250.12 |
| 2009/0119864 A1* | 5/2009 | Mayer | ................... | B60S 1/0814 15/250.14 |

FOREIGN PATENT DOCUMENTS

| | | | | |
|---|---|---|---|---|
| DE | 102005008636 A1 | 8/2006 | | |
| EP | 1447288 A2 * | 1/2004 | ................ | B60S 1/08 |
| EP | 1 447 287 A2 | 8/2004 | | |
| EP | 1447288 A2 * | 8/2004 | ................ | B60S 1/08 |
| EP | 1 447 288 B1 | 5/2007 | | |

OTHER PUBLICATIONS

NPL—Western Digital—Jumper Settings WD SATA and EIDE Hard Drives, Published in 2005. Accessed off the internet from: http://www.wdc.com/wdproducts/library/other/2579-001037.pdf on Oct. 10, 2014. Waybackmachine.org date is Dec. 3, 2010.EP-1447288 A2.*
International Search Report issued in PCT/EP2011/070633 mailed Mar. 15, 2012 (2 pages).
Written Opinion issued in PCT/EP2011/070633 mailed Mar. 15, 2012 (5 pages).
German Search Report issued in corresponding German Application No. 10 2010 052 775.0 dated Jul. 26, 2011 (8 pages).
Office Action issued in corresponding Chinese Application No. 2011800575855 dated Dec. 5, 2014, and English translation thereof (18 pages).

* cited by examiner

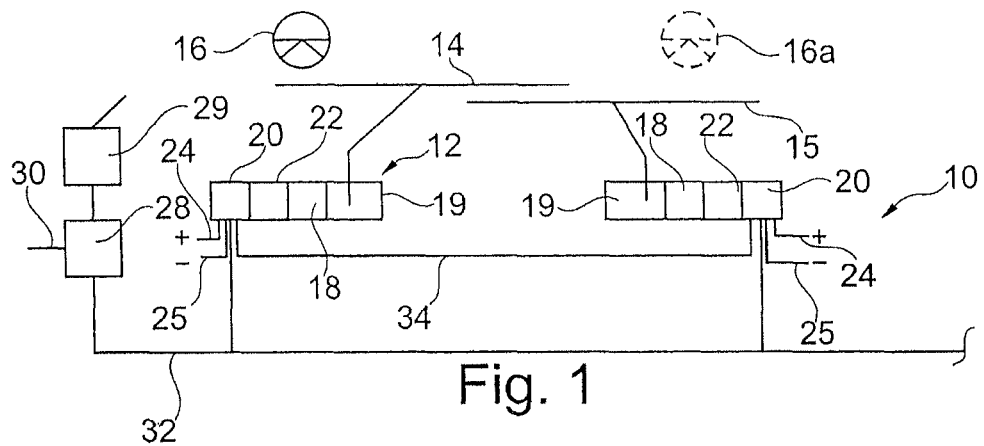
Fig. 1
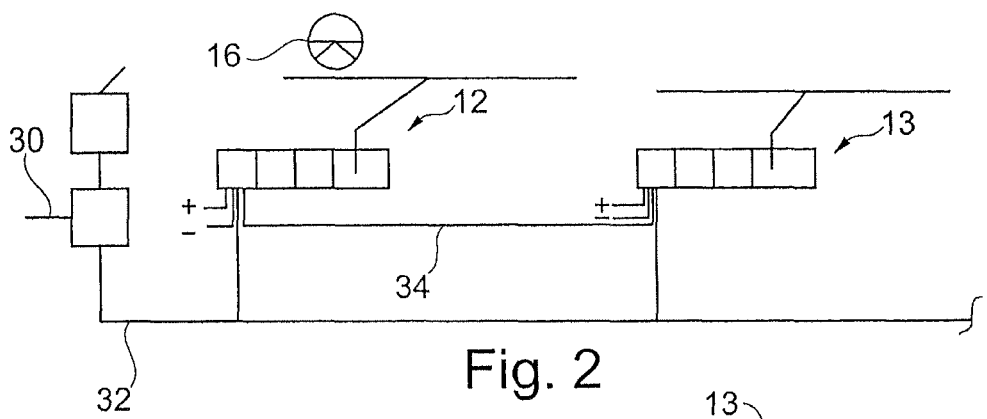
Fig. 2
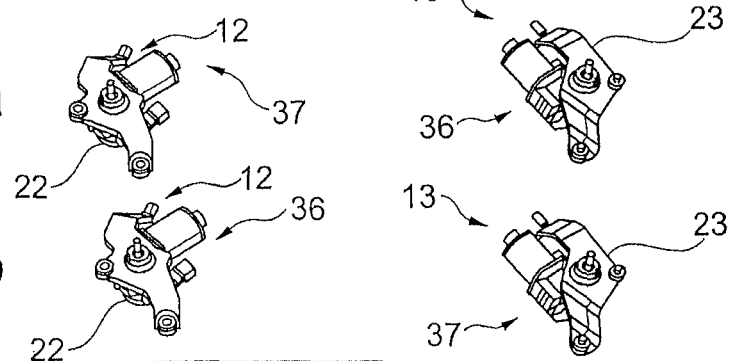
Fig. 3a
Fig. 3b
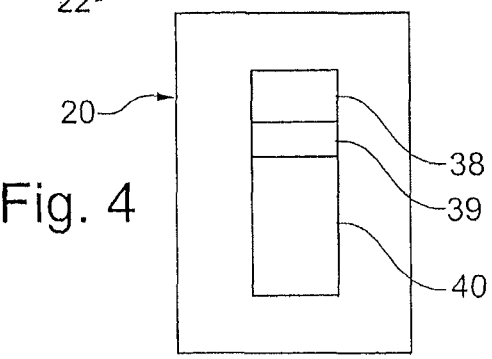
Fig. 4

METHOD FOR PROGRAMMING A WIPER SYSTEM FOR VEHICLE WINDSCREENS AND WIPER SYSTEM

PRIOR ART

The invention relates to a method for programming a wiper system for vehicle windscreens according to the introductory clause of claim 1. The invention further relates to a wiper system which is programmable by a method according to the invention.

Such a method is known from EP 1 447 288 B1. In wiper systems for vehicle windscreens, the problem exists that vehicles, depending on the vehicle market, are produced for right-hand drive or for left-hand drive. Basically, the module of the two wiper modules, which is arranged on the steering wheel side is configured or respectively programmed as a master module, whereas the wiper module on the passenger's side operates as a slave module. Furthermore, the wiper modules also generally have an installation-specific position, which is expressed in that, depending on the installation site, the wiper module either has a differently shaped carrier for fastening on the body of the motor vehicle, or at least has differently arranged fastening points. This means in practice that to cover all variant embodiments, four different wiper modules have to be produced or respectively stored, with corresponding logistical costs: Respectively a master and slave module in the embodiment either for installation on the right-hand side or left-hand side. In order to eliminate this problem, it is known from the above-mentioned EP 1 447 288 B1 to construct the control of the wiper modules via a vehicle control apparatus and the on-board wiring system interface for master- or slave control so as to be freely configurable or respectively unconfigurable. Provision is made here that respectively both the program sequence or respectively the data sets for a master module and also for a slave module are stored in the control of the wiper modules. In the factory setting, however, the wiper modules are configured as slave module, so that on use as master module the corresponding wiper module has to be reprogrammed. On the other hand, the slave module can remain in its delivery state.

DISCLOSURE OF THE INVENTION

Proceeding from the presented prior art, the invention is based on the problem of developing a method for programming a wiper system for vehicle windscreens according to the introductory clause of claim 1 such that alternative programming methods are made possible. Here, in fact, the term "programming" is always used below, but this term is also intended to include a calibrating of a wiper system, even if this is not explicitly mentioned further below. This problem is solved in a method for programming a wiper system for vehicle windscreens with the features of claim 1. The invention is based here on the idea, in the delivery state of the wiper module, of defining the latter neither as master module nor as slave module, so that in this operating mode it is undefined or respectively not capable of functioning in an installed state in the vehicle, and of firstly providing a corresponding characteristic at least to the wiper module which is to operate as master module, by a corresponding programming.

Advantageous further developments of the method according to the invention for programming a wiper system for vehicle windscreens are indicated in the subclaims. All combinations of at least two of features disclosed in the claims, the description and/or the figures fall within the scope of the invention.

In a preferred variant of the method according to the invention, it is proposed that in the control of each wiper module, the latter is predefined as a left-hand wiper module or right-hand wiper module in the vehicle direction, and that on activating at least the one wiper module connected with the first data communication line, vehicle-specific data are transmitted which switch the respective wiper module into a master mode or into a slave mode. In other words, this means that on delivery of a wiper module, the latter, in particular by its fastening to a specific carrier on the vehicle side, is predefined as a right-hand drive or respectively left-hand drive wiper module. This means that on sending vehicle-specific data to the wiper module during programming, the latter, as a result of its predetermined installation position, can automatically detect whether the wiper module is to operate as a master module or as a slave module.

In a further embodiment of the invention, provision is made that additional parameters are activated via the first data communication line from the control of the wiper module. Such parameters can, for example, be parameters which alter or respectively affect particular characteristic values or characteristics in the operation of the master module or slave module.

In a further preferred embodiment of the invention, provision is made that the programming to the slave module and the number of additional parameters takes place via the second data communication line from the master module. This had the advantage that a connection of the wiper module on the passenger's side, operating as slave module, with the first data communication line can be dispensed with, whereby the structural expenditure for a vehicle manufacturer can be reduced if applicable.

However, provision can also be made that both wiper modules are connected with the first data communication line.

The invention also comprises a wiper system which is programmable by a method according to the invention.

Figure 6:
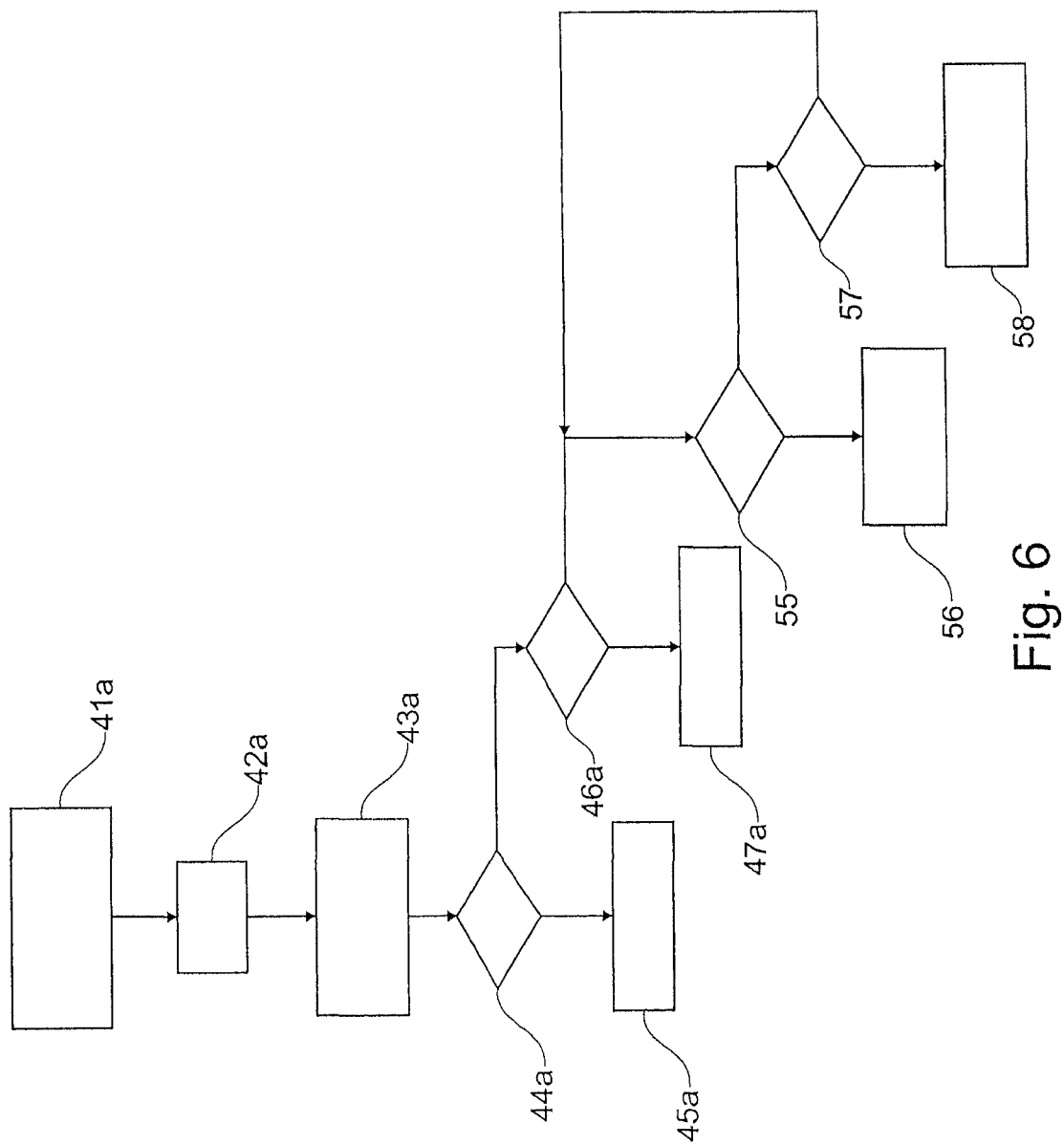

Further advantages, features and details of the invention will be apparent from the following description of preferred example embodiments and with the aid of the drawings, which show in:

FIG. 1 a diagrammatic illustration of a two-motor wiper system with non-identical wiper modules for a left-hand drive vehicle, FIG. 2 a two-motor wiper system, modified compared with FIG. 1, likewise in diagrammatic illustration, FIGS. 3a, 3b an illustration of various wiper modules with their carriers for mounting onto a vehicle body, in perspective view, FIG. 4 a simplified illustration of a control program of a wiper module, FIG. 5 a first flow diagram for configuration of the wiper system before mounting of the wiper arm and FIG. 6 a flow diagram which is modified compared with FIG. 4.

Identical components or respectively components having the same function are given the same reference numbers in the figures.

In FIG. 1 a first wiper system 10 according to the invention for vehicle windscreens is illustrated in a simplified manner. The wiper system 10 has two wiper modules 12, 13, wherein each of the two wiper modules 12, 13 is coupled with a windscreen wiper 14, 15 via a wiper linkage which is not illustrated in further detail. Of course, provision may also be made that the wiper modules 12, 13 also cooperate with the windscreen wipers 14, 15 directly, i.e. without the use of a wiper linkage. The motor vehicle, which is not illustrated in FIG. 1, is a so-called left-hand drive vehicle, in which a steering wheel 16 is arranged on the left-hand side in the direction of travel. It is also possible that the wiper system 10 is arranged in a right-hand drive vehicle. In this case, the steering wheel 16a is arranged on the right-hand side of the vehicle in the direction of travel, which is intended to be illustrated by the illustration of the steering wheel 16a in dashed lines.

Each of the two wiper modules 12, 13 has a reversing motor 18, a gear 19 and a control 20. In addition, each of the wiper modules 12, 13 is also provided with a mount 22, 23, which couples the wiper module 12, 13 mechanically on the body of the motor vehicle, in particular in its engine compartment.

It is essential here that, as can best be seen with the aid of FIG. 3a, 3b, depending on whether the wiper module 12, 13 is arranged on the driver's side or on the passenger's side, either a mount 22 is necessary or a mount 23 which is different from the latter. In addition it is to be mentioned that possibly also identical mounts 22, 23 can be used, but owing to different mounting sites of the mounts 22, 23 in any case different wiper modules 12, 13 are formed for the driver's or respectively passenger's side.

The controls 20 of the two wiper modules 12, 13 are connected respectively via a plus terminal 24 to the on-board wiring system of the motor vehicle. In addition, the respective wiper module 12, 13 is connected with ground potential via a ground connection 25.

The wiper system 10 described so far is connected with a vehicle control unit 28. Furthermore, a wiper switch 29, via which the wiper system 10 or respectively the wiper modules 12, 13 are activated, is connected to the vehicle control unit 28. In addition, the vehicle control unit 28 can be optionally equipped with an interface 30, via which in particular the programming of the wiper system 10 can take place. The connection between the vehicle control unit 28 and the wiper system 10 or respectively the wiper modules 12, 13 takes place via a first data communication line 32, wherein the first data communication line 32 is constructed in the form of a single-wire control line. The first data communication line 32 is part here of the vehicle bus system. Furthermore, an internal bus connection is provided in the form of a second data communication line 34, which connects the two controls 20 of the two wiper modules 12, 13 with each other.

The wiper system 10a illustrated in FIG. 2 is illustrated with the example of a left-hand drive vehicle. Unlike the wiper system 10 according to FIG. 1, the second wiper module 13 is connected here only via the second data communication line 34 with the first wiper module 12. A connection between the vehicle control unit 28 and the wiper module 13 via the first data communication line 32 is not provided. Rather, only the first wiper module 12 is connected via the first data communication line 32 with the vehicle control unit 28.

It is essential that depending on whether a left-hand drive vehicle or a right-hand drive vehicle is concerned, i.e. depending on whether the steering wheel 16, 16a is arranged on the left- or right-hand side of the vehicle in the direction of travel, the wiper module 12, 13 which is situated on the driver's side operates as master module 36, whereas the wiper module 12, 13 which is situated on the passenger's side operates as slave module 37. With the aid of FIGS. 3a and 3b, it can be seen that in connection with the two different mounts 22, 23 therefore four different configurations of the master module 36, slave module 37 and mounts 22, 23 are possible.

With the aid of FIG. 4 it can be seen that the software of the controls 20 of the wiper modules 12, 13 consist at least respectively of a program sequence data set 38 and a vehicle-specific characteristic data set 39. The characteristic data set 39 comprises here for example different wiper fields, depending on whether the control 20 operates in a wiper module 12, 13 as master module 36 or as slave module 37. In addition, the characteristic data set 39 can contain vehicle type-specific data sets, such that for example with the use of a wiper module 12, 13 in a first vehicle, different wiper fields are necessary than with the use in a second vehicle. The program sequence data set 38 contains in particular different data sets depending on whether the control 20 is operated as master module 36 or as slave module 37.

In addition, the software of the control 20 contains a data set 40, in which there is stored whether the wiper module 12,13, viewed in the vehicle direction, is installed on the right-hand or left-hand side. It is essential here that the activation or respectively the content of the program block 40 in a first embodiment of the invention already takes place on the delivery of the wiper module 12, 13 to a vehicle manufacturer, but at the latest before the immediate installation of the wiper module 12, 13 into a respective motor vehicle. In other words, this means that on installation of the wiper module 12, 13, via the data set 40 the corresponding wiper module 12, 13 already contains the information as to whether the wiper module 12, 13 will be installed on the left-hand or right-hand side in the direction of travel.

In FIG. 5 the sequence of the programming of the wiper modules 12, 13 is now explained in further detail, in which the two wiper modules 12, 13 are installed with the corresponding information concerning their installation site in the left-hand or right-hand side of the vehicle in the program block 40 in the motor vehicle. Here, it is assumed in the program step 41 that the two wiper modules 12, 13 are installed in the motor vehicle and the controls 20 of the two wiper modules 12, 13 are connected via the first data communication line 32 with the vehicle control unit 28. Furthermore, the two controls 20 of the wiper modules 12, 13 are additionally connected with each other via the second data communication line 34. The second data communication line 34 is in a receive mode and the first data communication line 32 is activated. Such a case of installation is illustrated in FIG. 1.

In a second program step 42, a voltage is now applied to the vehicle control unit 28. This has the result that in a third program step 32, via the first data communication line 43, vehicle-specific data, i.e. in particular data concerning the use of the motor vehicle as a right-hand drive vehicle or left-hand drive vehicle, and if applicable the specific vehicle type, are transmitted to the two controls 20 of the wiper modules 12, 13. In connection with the data stored in the data set 40 of the wiper module 12, 13, the respective wiper module 12, 13 thereby recognizes whether it is to operate as master module 36 or as slave module 37.

In the program step 44 an enquiry is now made as to whether the wiper module 12, 13 is configured as master module 36. If this is the case, then the respective wiper module 12, 13, operated as master module 36, starts its communication with the vehicle control unit 28 via the first data communication line 32 in a program step 45.

If, however, the wiper module 12, 13 is not configured as master module 37, an enquiry is made in a program step 46 as to whether the wiper module 12, 13 is configured as slave module 37. If this is the case, the first data communication line 32 is deactivated in accordance with program step 47 and a communication takes place between the two wiper modules 12, 13 only via the second data communication line 34. If, on the other hand, it has been established in the program step 46 that the respective wiper module 12, 13 is not configured as slave module 37, an enquiry is made in a program step 48 as to whether the respective wiper module 12, 13 has received vehicle-specific information via the first data communication line 32.

If this is not the case, an enquiry is made via a program step 49 as to whether the configuration to the slave module 37 has taken place through information which the respective wiper module 12, 13 has received from the master module 36 via the second data communication line 34. If this is the case, in a program step 50 the first data communication line 32 between the slave module 37 and the vehicle control unit 28 is deactivated and the configuration of the respective wiper module 12, 13 as slave module 37 is stored in the EEPROM. For the case where in the program step 49 no information is present regarding data concerning a configuration via the second data communication line 34, a feedback into the program step 48 takes place.

If, on the other hand, it is established in the program step 48 that the respective wiper module 12,13 has received vehicle-specific information via the first data communication line 32, in a program step 51 the respective wiper module 12, 13 is configured as master module 46 or respectively slave module 37 in accordance with the information stored in the data set 40. In a program step 52, thereafter the enquiry takes place as to whether the respective wiper module 12, 13 is configured as master module 36. If this is not the case, a feedback takes place to the program step 48. If, on the other hand, this is the case, the corresponding programming to the master module 36 in the EEPROM is stored in program step 53 and the data communication begins via the first data communication line 32.

In FIG. 6 a modified program sequence is illustrated, as is used in a wiper system 10a in accordance with FIG. 2. Provision is made here that only the master module 36 is connected via the first data communication line 32 with the vehicle control unit 28, whereas the slave module 37 only communicates via the second data communication line 34 with the master module 36, but otherwise has no connection with the vehicle control unit 28 via the first data communication line 32.

In the modified program sequence, the program steps 41a to 47a correspond to the program steps 41 to 47 of FIG. 5. Alternatively, instead of the program step 48, a program step 55 follows the program step 46a, in which an enquiry is made as to the path on which a vehicle-specific notification was received. If this took place via the first data communication line 28, then in a program step 56 the corresponding wiper module 12, 13 is recognized as master module 36, this state is stored in the EEPROM and the communication between the respective wiper module 12,13 and the vehicle control unit 28 via the first data communication line 28 is started.

If, on the other hand, the information was received via the second data communication line 34, then in a program step 57 this is verified once again, and on a verification, in a program step 58, the respective wiper module 12, 13 is identified as slave module 37. The corresponding information is stored in the EEPROM and the communication via the first data communication line 32 is deactivated, so that a communication between the master module 36 and the slave module 37 is now made possible only via the second data communication line 34. Alternatively, a feedback into the program step 55 follows the program step 57.

In a further variant embodiment of the invention, which is not illustrated, provision is made that the data set 40 does not contain any information as to whether the respective wiper module 12, 13 is situated on the left-hand side or right-hand side in the direction of travel. This case occurs when the wiper module 12, 13 can be installed both on the right-hand and also on the left-hand side of the vehicle. In this case, a differentiation between master module 36 and slave module 37 is carried out via both data communication lines 32 and 34. Here, however, only the master module 36 is connected via the first data communication line 32 with the vehicle control unit 28 and receives via it the vehicle-specific information. Based on this information, the wiper module 12, 13 can be identified as master module 36, whereupon the programming of the second wiper module 12, 13 as slave module 37 takes place only via the second data communication line 34.

The programming methods described so far for the wiper system 10, 10a can be altered or respectively modified in various ways. For example, it is also conceivable to provide both wiper modules 12, 13 with a factory setting as master module 36 or to connect actively both activations (to the master module 36 or slave module 37) in the data set 40.

LIST OF REFERENCE NUMBERS 10, 10a wiper system
12, 13 wiper module
14, 15 windscreen wiper
16, 16a steering wheel
18 reversing motor
19 gear
20 control
22, 23 mount
24 plus terminal
25 ground connection
28 vehicle control unit
29 wiper switch
30 interface
32 first data communication line
34 second data communication line
36 master module
37 slave module
38 program sequence data set
39 characteristic data set
40 data set
41;41a to 47; 47a program step
48-58 program step

The invention claimed is:

1. A method for programming a wiper system for vehicle windscreens, comprising:
   installing a first wiper module and a second wiper module on a vehicle,
      wherein the first wiper module comprises a control, the control comprises a processor and a non-volatile memory that is configured to store and process at least data for a program sequence, and
      wherein the program sequence comprises:
         enquiring, by the processor, whether the first wiper module operates as master module;
         starting a communication with the processor via a first data communication line if the first wiper module is determined to be operating as master module;
         identifying, by the processor, whether the first wiper module operates as slave module if the first wiper module is not determined to be operating as master module; and
         deactivating the first data communication line and starting a communication between the first wiper module and the second wiper module if the first wiper module is determined, by the processor, to be operating as slave module.

2. The method according to claim 1, wherein the program sequence further comprises:

enquiring, by the processor, whether the first wiper module has received vehicle-specific information via the first data communication line if the first wiper module is not determined to be operating as slave module;

enquiring, by the processor, whether configuration of slave module has already taken place via a second data communication line if the first wiper module has not received vehicle-specific information via the first data communication line;

deactivating the first data communication line between the slave module and the processor and storing configuration of the first wiper module as slave module in the non-volatile memory if the first wiper module has received vehicle-specific information via the first data communication line; and enquiring, by the processor, whether configuration of slave module has already taken place via the second data communication line if the first wiper module has not received vehicle-specific information via the first data communication line.

3. The method according to claim 2, wherein the program sequence further comprises:

enquiring, by the processor, whether the first wiper module has received vehicle-specific information via the first data communication line if no configuration information can be retrieved from the non-volatile memory via the second data communication line.

4. The method according to claim 2, wherein the program sequence further comprises:

configuring, by the processor, the first wiper module to operate as master module if the first wiper module has received vehicle-specific information via the first data communication line.

5. The method according to claim 4, wherein the program sequence further comprises:

enquiring, by the processor, whether the first wiper module is configured to operate as master module;

storing configuration of the first wiper module as master module in the non-volatile memory if the first wiper module is determined to be operating as master module; and enquiring, by the processor, whether the first wiper module has received vehicle-specific information via the first data communication line if the first wiper module is determined not to be operating as master module.

6. The method according to claim 4, wherein the program sequence further comprises:

enquiring, by the processor, whether the first wiper module is configured to operate as master module; and storing configuration of the first wiper module as master module in the non-volatile memory if the first wiper module is determined to be operating as master module.

7. The method according to claim 2, wherein the non-volatile memory is an Erasable Programmable Read-Only Memory ("EEPROM").

* * * * *